United States Patent
Berry et al.

(10) Patent No.: US 8,084,402 B2
(45) Date of Patent: Dec. 27, 2011

(54) METHOD OF USING IONIC LIQUIDS TO INHIBIT OR PREVENT THE SWELLING OF CLAY

(75) Inventors: Sandra L. Berry, Tomball, TX (US); Brian B. Beall, Spring, TX (US); Joel L. Boles, Spring, TX (US); Harold D. Brannon, Magnolia, TX (US)

(73) Assignee: Baker Huges Incorporated, Houston, TX (US)

( * ) Notice: Subject to any disclaimer, the term of this patent is extended or adjusted under 35 U.S.C. 154(b) by 618 days.

(21) Appl. No.: 11/880,726

(22) Filed: Jul. 24, 2007

(65) Prior Publication Data

US 2009/0029880 A1    Jan. 29, 2009

(51) Int. Cl.
- C09K 8/60 (2006.01)
- C09K 8/32 (2006.01)
- E21B 43/26 (2006.01)

(52) U.S. Cl. ............... 507/240; 507/129; 166/305.1; 166/307

(58) Field of Classification Search .............. 507/129, 507/240; 166/305.1, 307
See application file for complete search history.

(56) References Cited

U.S. PATENT DOCUMENTS

| | | | |
|---|---|---|---|
| 4,439,489 A | | 3/1984 | Johnson et al. |
| 4,842,073 A | * | 6/1989 | Himes et al. .......... 166/294 |
| 5,197,544 A | | 3/1993 | Himes |
| 5,342,530 A | | 8/1994 | Aften et al. |
| 5,771,971 A | | 6/1998 | Horton et al. |
| 5,887,653 A | | 3/1999 | Bishop et al. |
| 6,350,721 B1 | | 2/2002 | Fu et al. |
| 6,608,005 B2 | | 8/2003 | Palmer et al. |
| 6,921,741 B2 | | 7/2005 | Arendt et al. |
| 6,924,253 B2 | | 8/2005 | Palmer et al. |

* cited by examiner

*Primary Examiner* — Timothy J. Kugel
*Assistant Examiner* — Aiqun Li
(74) *Attorney, Agent, or Firm* — John Wilson Jones; Jones & Smith, LLP

(57) ABSTRACT

An ionic liquid may be used to inhibit the swelling and/or disintegration of clay in a subterranean formation. A subterranean clay-containing formation may be treated with the ionic liquid by contacting the formation with a well treatment composition containing the ionic liquid dispersed or dissolved in a carrier fluid. Damage to the formation caused by contact with the well treating composition is reduced or substantially eliminated.

25 Claims, No Drawings

METHOD OF USING IONIC LIQUIDS TO INHIBIT OR PREVENT THE SWELLING OF CLAY

FIELD OF THE INVENTION

Ionic liquids may be used as shale inhibitors and/or clay stabilizing agents in oil and gas formations and have particular applicability in drilling fluids, completion fluids, frac fluids, acidizing fluids and remedial fluids.

BACKGROUND OF THE INVENTION

Subterranean formations are often composed of soft shales which are relatively unstable clay-containing formations. During drilling of the well, such shales are typically dispersed as cuttings into the drilling fluid. The sloughing or influx of the shale and/or other earth formation materials into the drilling fluid is often problematic. While large drilled cuttings may be removed by solids control equipment at the surface of the wellbore, shale particles traveling in the formation typically degrade into smaller particles which can adversely result in loss of formation permeability, significant reduction in flow rate and stability of the surrounding formation. In addition, drilling time and costs are often substantially increased.

The possibility of damage caused by the swelling and migration of clay in oil and gas producing formations further poses problems during well treatment processes. For instance, the swelling and migration of formation clays, presents problems during stimulation and well completion.

While formation clays are ordinarily inert, the swelling and migration of formation clay particles is often increased when formation clays are disturbed by foreign substances, such as aqueous well treatment fluids. Such well treatment fluids include fracturing fluids. The swelling and migration of formation clay reduces the permeability of the formation by obstructing the formation capillaries and therefore resulting in a loss of formation permeability and significant reduction in the flow rate of hydrocarbons. Such obstruction results, for example, by the migration of formation clays into capillary flow channels of the formation. This, in turn, typically causes significant reduction in the flow rate of produced hydrocarbons.

Attempts to diminish the damaging effects caused by the swelling and migration of formation clays has included the use of aqueous well treatment fluids containing one or more additives. For instance, clay disintegration in drilling fluids is often effectuated by the use of drilling fluids containing one or more shale inhibitors. In other well treatment fluids, such as stimulation fluids and remedial fluids, a clay stabilizer is included.

Shale inhibitors and clay stabilizers are known to stabilize clay formation materials. They work on the principle of substitution of a cationic species in the clay lattice for a sodium ion. The cationic species is generally selected such that its radius of hydration is less than that of the sodium ion. It is believed that the molecules of shale inhibitors and clay stabilizers become adsorbed onto the surface of the clay and compete with molecules of water for reactive sites. Thus, the possibility of swelling and migration in the formation clay is minimized upon contact of the formation clay with a foreign, or well treatment, fluid. As a result, the probability of disintegration of formation clays is diminished. In addition, stabilization of the formation clay inhibits clay swelling.

Potassium chloride is widely used as a shale inhibitor and/or clay stabilizer. In stimulation methods, potassium chloride has often been used as a preflush and/or added to aqueous stimulation fluids in order to convert the clay to a less swellable form. While such salts diminish the reduction of formation permeability, they are often detrimental to the performance of other constituents of the well treatment fluid. For example, high concentration of such salts is typically required for stabilization of clay (typically 3%). Such salts further produce high chloride levels which are environmentally unacceptable.

While other alternatives have been reported in the literature, they too are often undesirable because of their potent odor and/or poor effectiveness in formations with low permeability.

Alternative materials have therefore been sought, especially for use in drilling, fracturing and work over procedures. It is desirable that such alternative materials have low toxicity levels and minimize environmental pollution and harm to operators. In addition, it is desirable that such alternative materials not inhibit the performance of other additives in the well treatment fluid.

SUMMARY OF THE INVENTION

An ionic liquid may be used as a shale inhibitor and/or clay stabilizer with an aqueous well treatment fluid and introduced as a downhole fluid into a subterranean formation. Swellable materials, such as clay, in the formation are substantially inhibited from disintegration and/or prevented from swelling by use of the ionic liquid. As such, the ionic liquid is capable of reducing, or substantially eliminating, permeability damage attributable to the swelling and migration of formation clays upon their exposure to water or fluids foreign to the formation.

The ionic liquid may further be used as a partial or total substitute of potassium chloride, a conventional shale inhibitor and/or clay stabilizer. As a result, the chloride level reduced into the environment may be sharply reduced by use of the ionic liquid.

The ionic liquid is composed of at least one cation and at least one anion. The cation may be an imidazolium of the formula (I):

wherein $R^1$ and $R^2$ are independently a $C_1$-$C_6$ alkyl group or a $C_1$-$C_6$ alkoxyalkyl group and $R^3$, $R^4$ and $R^5$ are independently may be —H, a $C_1$-$C_6$ alkyl, a $C_1$-$C_6$ alkoxyalkyl group or a $C_1$-$C_6$ alkoxy group.

Alternatively, the cation may be a quaternary ammonium, such as those of formula (II):

wherein $R^6$, $R^7$, $R^8$ and $R^9$ are independently a $C_1$-$C_6$ alkyl group or a hydroxyalkyl group wherein the alkyl group is preferably a $C_1$-$C_6$ alkyl. Preferably, each $R^6$, $R^7$ and $R^8$ is a hydroxyalkyl, such as 2-hydroxyethyl, and $R^9$ is an alkyl group, such as methyl. In another preferred embodiment, each of $R^6$, $R^7$, $R^8$ and $R^9$ are an alkyl group.

The anion of the ionic liquid is preferably a halide, X, perchlorate, thiocyanate, cyanate, a $C_1$-$C_6$ carboxylate, an alkyl sulfate, methanesulfonate, $BX_4^-$, $PF_6^-$, $AsF_6^-$, $SbF_6^-$, $NO_2^-$, $NO_3^-$ or $SO_4^-$, where X is a halide.

DETAILED DESCRIPTION OF THE PREFERRED EMBODIMENTS

The ionic liquids referenced herein may be used as shale inhibitors and/or clay stabilizers and/or KCl substitutes to inhibit the swelling and migration of clay subterranean materials which have a tendency to exhibit swelling upon exposure to water. Such subterranean materials shall be referred to herein as "swellable clays". The term shall include those clays which swell, disperse, disintegrate or otherwise become disrupted, thereby demonstrating an increase in bulk volume, in the presence of foreign aqueous well treatment fluids such as drilling fluids, stimulation fluids, workover fluids, gravel packing fluids, etc. The term shall include those clays which disperse, disintegrate or otherwise become disrupted without actual swelling. For instance, clays which, in the presence of well treatment fluids, expand and may be disrupted by becoming unconsolidated, thereby producing particles which migrate into a borehole, shall be included by the term.

The ionic liquids defined herein may be used as a partial or total potassium chloride substitute when the potassium chloride is used as a shale inhibitor and/or clay stabilizer. In addition, the ionic liquid may be used as a shale inhibitor and/or clay stabilizer in methods wherein potassium chloride or other inorganic salts have not traditionally been used.

The ionic liquids are composed entirely of ions and are typically fluid at, around, or below 100° C. Preferably, the ionic liquids exhibit a working temperature range between from about −40 to about 200° C. The ionic liquids, containing at least one organic cation and at least one inorganic or organic anion, are further preferably hydrophilic. The ionic liquids defined herein are typically capable of dissolving a large variety of organic, inorganic, and polymeric materials, such as those normally used in well treatment fluids. They typically do not dissolve glass or polyethylene and are resistant to water and air oxidation. In addition, the ionic liquids typically have essentially zero vapor pressure and zero volatility. This allows for their use in high temperature reactions without the requirement of a pressure vessel to contain the vapors. They further characteristically have high flash points, typically up to 186° C. and high inflammation point, typically above 515° C.

When combined with an aqueous fluid to render a well treatment composition, the ionic liquid is capable of reducing or substantially eliminating damage to the formation caused by the swellable clays. The presence of the ionic liquid eliminates or reduces the tendency of the formation clay to swell or disintegrated/migrate upon contact with the well treatment composition.

Such inhibition may be temporary or substantially permanent depending on the quantity of the well treatment composition used to treat the formation. Thus, another advantage of using the disclosed ionic liquids is evidenced in their ability to provide permanent clay stabilization. Temporary clay stabilizers are materials that protect the formation only during treatment of the formation with the well treatment fluid. Migration of natural fluids over the formation over time displaces the foreign cation, thereby reverting the clay back to its natural swelling form. Permanent clay stabilization has been evidenced by use of the disclosed ionic liquids. For instance, when used as a KCl substitute or clay stabilizer, clay particulates have been demonstrated not to loose their affinity for such ionic liquids. Thus, upon being re-exposed to fresh water, the clay particulates do not swell (or minimally swell), compared to clay particulates that had not been treated with such ionic liquids or with a clay stabilizer of the prior art.

In a preferred embodiment, the cation is an imidazolium. Suitable imidazoliums include those of formula (I):

(I)

wherein $R^1$ and $R^2$ are independently a $C_1$-$C_6$ alkyl group or a $C_1$-$C_6$ alkoxyalkyl group and $R^3$, $R^4$ and $R^5$ are independently may be —H, a $C_1$-$C_6$ alkyl, a $C_1$-$C_6$ alkoxyalkyl group or a $C_1$-$C_6$ alkoxy group. In a preferred embodiment, $R^3$, $R^4$ and $R^5$ are each hydrido. Further, $R^1$ and $R^2$ are preferably methyl or ethyl.

Alternatively, the cation may be a quaternary ammonium, such as those of formula (II):

$$N(R^6)(R^7)(R^8)(R^9) \qquad (II)$$

wherein $R^6$, $R^7$, $R^8$ and $R^9$ are independently a $C_1$-$C_6$ alkyl group or a hydroxyalkyl group wherein the alkyl group is preferably a $C_1$-$C_6$ alkyl. Preferably, each $R^6$, $R^7$ and R8 is a hydroxyalkyl, such as 2-hydroxyethyl, and $R^9$ is an alkyl group, such as methyl. In another preferred embodiment, each of $R^6$, $R^7$, $R^8$ and $R^9$ are an alkyl group.

The anion of the ionic liquid is preferably a halide, X, perchlorate, thiocyanate, cyanate, a $C_1$-$C_6$ carboxylate, an alkyl sulfate, methanesulfonate, $BX_4^-$, $PF_6^-$, $AsF_6^-$, $SbF_6^-$, $NO_2^-$, $NO_3^-$ or $SO_4^-$; wherein X is a halide, preferably chloride, bromide, iodide or fluoride. In a preferred embodiment, the anion is a halide.

Preferred ionic liquids include 1-ethyl-3-methylimidazolium chloride, tris-(2-hydroxyethyl)-methylammonium methylsulfate, methyl tri-n-butyl ammonium methylsulfate, 1-ethyl-3-methylimidazolium methanesulfonate, 1-butyl-3-methylimidazolium chloride, 1-butyl-3-methylimidazolium methanesulfonate, 1-ethyl-2,3-di-methylimidazolium ethylsulfate and 1,2,3-trimethyl-imidazolium methylsulfate. Especially preferred are 1-ethyl-3-methylimidazolium chloride, methyl-tri-n-butylammonium methylsulfate and tris-(2-hydroxyethyl)-methylammonium methylsulfate.

The aqueous fluid is one which is capable of delivering the ionic liquid into the subterranean formation. For instance, the aqueous fluid may be drilling fluid, drill-in fluid, stimulation, such as a fracturing fluid or acidizing fluid, a remedial fluid (such as an acidizing fluid or a scale inhibition fluid, or a gravel pack fluid. Such fluids may contain a gelling agent to increase the viscosity of the fluid. In a preferred embodiment, the ionic liquid clay stabilizer is entrained within the aqueous fluid.

The ionic liquid may be admixed with the aqueous fluid in an amount effective to substantially stabilize the shale and/or clay containing formation against permeability reduction upon contact of the formation with the well treatment fluid. The amount of ionic liquid in the well treatment composition is typically between from about 0.06 to about 0.03 percent by volume. Preferably, the amount of ionic liquid in the well treatment composition is at least 0.03% by volume.

The admixture of ionic liquid and aqueous fluid may be agitated until dissolution is complete. Alternatively, the admixture may be formed by agitating the mixture for a five minute period time until the ionic liquid is adequately mixed into the fluid.

The ionic liquid is effective in treating a subterranean formation when transported in the well treatment composition with the aqueous fluid. The well treatment composition may have an acidic, alkaline or neutral pH, such as those in the range of from about 1 to 11.

Clays which may effectively be treated with the ionic liquid may be of varying shapes, such as minute, plate-like, tube-like and/or fiber-like particles having an extremely large surface area. Suitable clays are clay minerals of the montmorillonite (smectite) group such as montmorillonite, saponite, nontronite, hectorite, and sauconite; the kaolin group such as kaolinite, nacrite, dickite, and halloysite; the hydrousmica group such as hydrobiotite, glauconite, illite and bramallite; the chlorite group such as chlorite and chamosite; clay minerals not belonging to the above groups such as vermiculite, attapulgite, and sepiolite, and mixed-layer varieties of the such minerals and groups. Other mineral components may further be associated with the clay.

In a preferred embodiment, the ionic liquid is used to enhance the recovery of hydrocarbon fluids produced from a hydrocarbon-producing subterranean formation. As such, the well treatment composition may be a stimulation fluid wherein the aqueous fluid may be a conventional stimulation treatment fluid, such as those containing a solvatable polysaccharide gelling agent like galactomannan gum, glucomannan gum, cellulose derivative, etc. Such stimulation fluids may therefore be fracture stimulation fluid and/or acid stimulation fluid and may further include a crosslinking agent.

Other well treating applications may be near wellbore in nature (affecting near wellbore regions) and may be directed toward improving wellbore productivity and/or controlling the production of fracture proppant or formation sand. Particular examples include gravel packing and "frac-packs." Moreover, such particles may be employed alone as a fracture proppant/sand control particulate, or in mixtures in amounts and with types of fracture proppant/sand control materials, such as conventional fracture or sand control particulate.

In one exemplary embodiment, a gravel pack operation may be carried out on a wellbore that penetrates a subterranean formation to prevent or substantially reduce the production of formation particles into the wellbore from the formation during production of formation fluids. The subterranean formation may be completed so as to be in communication with the interior of the wellbore by any suitable method known in the art, for example by perforations in a cased wellbore, and/or by an open hole section. A screen assembly such as is known in the art may be placed or otherwise disposed within the wellbore so that at least a portion of the screen assembly is disposed adjacent the subterranean formation. A slurry including the cellulosic particulates and a carrier fluid may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore. It is possible that the slurry may contain all or only a portion of the cellulosic particulate. In the latter case, the balance of the particulate material of the slurry may be another material, such as a conventional gravel pack particulate.

As an alternative to use of a screen, the sand control method may use the cellulosic particulate in accordance with any method in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel pack screen, may be introduced into a wellbore at pressures below, at or above the fracturing pressure of the formation, such as frac pack, and/or may be employed in conjunction with resins such as sand consolidation resins is so desired.

The aqueous fluid may further contain conventional additives in combination with the clay stabilizer, including bactericides, gel breakers, iron control agents, foaming agents such as surfactants, gases or liquefied gases, stabilizers, etc.

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims which follow.

EXAMPLES

In the Examples, the following materials were used:

1-ethyl-3-methylimidazolium chloride ("IC 1"), an ionic liquid;

methyl-tri-n-butylammonium methylsulfate ("IC 2"), an ionic liquid;

tris (2-hydroxyethyl-methyl-ammonium methyl sulfate) ("IC 3"), an ionic liquid;

CLAY MASTER 5C, a cationic clay stabilizer, a product of BJ Services Company; and CLAY TREAT-3C, a clay stabilizer substitute for potassium chloride, a product of BJ Services Company.

Examples 1-13

The effectiveness of ionic liquids on clay stabilization was evaluated in a sand/clay mixture by measuring the amount of aqueous clay slurry released as a filtrate. Approximately 250 ml of base fluid was placed into a Waring blender. About 30 grams of a sand/clay mixture (24.9 grams of silica flour and 5.1 grams of bentonite clay) was then added to the blender and the admixture mixed for 5 minutes at high speed. The slurry was then placed into a 500 ml glass beaker and allowed to hydrate for 25 minutes. After 15 minutes, the slurry was remixed with a glass stirring rod and a 1 ml sample was used in a filtration time test using a Capillary Suction Time (CST) instrument. The CST data was recorded in seconds and repeated to obtain consistent readings.

The beaker contents were then transferred to a Fann filter press while stirring the slurry to avoid any phase separation. The Fann filter press was comprised of a metal cylinder having a bottom aperture covered with a wire mesh over which Whatman No. 50 filter paper was placed. Upon transfer of the clay slurry to the Fann filter press, some gravity filtration drainage from the slurry was noted through the filter medium. Such drainage was permitted to continue for five minutes. The cell's lid was then secured, and pressure within the cell was raised to 20 psi. The water filtrate that passed through the mesh and filter paper was collected, and the cumulative filtrate volume, from both the gravity filtration drainage and the after pressure volume was measured, and recorded at intervals of 0 (5-minute gravity feed), 1, 3, 5 and 10 minutes of elapsed time, and measured until either the end of the time periods or the commencement of the filtration fluid volume.

The CST measured the filtration time on sized filter paper using spaced electrodes attached to an automatic timer. The testing defined the time of movement of water front between the two electrodes which related to the ability of the fluid to prevent the swelling of clays present in the sand/clay pack mixture. When multiple aqueous fluid composition samples were compared in the same sand/clay pack composition a longer time of water front movement indicated increased clay swelling and less clay swelling inhibition by the aqueous fluid composition. Longer CST times indicated poorer clay control by the fluid clay stabilizer component.

The results are set forth in Table I:

TABLE I

| Ex. No. | Base Fluid | mls of fluid/minutes | | | | | CST Time (sec.) |
|---|---|---|---|---|---|---|---|
| | | 0 | 1 | 3 | 5 | 10 | |
| 1 | DI Water + 1 gpt IC1 (75% by vol. in DI water) | 1 | 7 | 22 | 27 | 40 | 350 |
| 2 | DI Water + 1.25 gpt IC1 (75% by vol. in DI water) | 6 | 35 | 66 | 87 | 125 | 105 |
| 3 | DI Water + 1.50 gpt IC1 (75% by vol. in DI water) | 3 | 45 | 95 | 135 | 206 | 40 |
| 4 | DI Water + 1.75 gpt IC1 (75% by vol. in DI water) | 6 | 69 | 141 | 190 | 212 | 29.5 |

TABLE I-continued

| Ex. No. | Base Fluid | mls of fluid/minutes | | | | | CST Time (sec.) |
|---|---|---|---|---|---|---|---|
| | | 0 | 1 | 3 | 5 | 10 | |
| 5 | DI Water + 2.0 gpt IC1 (75% by vol. in DI water) | 3 | 62 | 135 | 195 | * | 26.0 |
| | | | 215 cc at 350 seconds | | | | |
| 6 | DI Water + 3.0 gpt IC1 (75% by vol. in DI water) | 5 | 87 | 176 | * | * | 23.1 |
| | | | 210 cc at 221 seconds | | | | |
| 7 | DI Water + 4.0 gpt IC1 (75% by vol. in DI water) | 3 | 116 | * | * | * | 20.0 |
| | | | 207 cc at 158 seconds | | | | |
| 8 | DI water + 1 gpt IC2 (75% by vol. in DI water) (foamy solution) | 2 | 7 | 15 | 18 | 28 | >400 |
| 9 | DI water + 2 gpt IC2 (75% by vol. in DI water) (foamy solution) | 2 | 35 | 64 | 88 | 144 | 81.5 |
| 10 | DI water + 3 gpt IC2 (75% by vol. in DI water) (foamy solution; thick solids) | 3 | 64 | 130 | 173 | * | 51.0 |
| | | | 188 cc at 400 seconds | | | | |
| 11 | DI water + 2 gpt IC3 | 7 | 60 | 111 | 140 | 208 | 49.8 |
| 12 | DI water + 4 gpt IC3 | 7 | 63 | 122 | 162 | * | 32.5 |
| | | | 208 cc @ 595 seconds | | | | |
| 13 | DI water + 6 gpt IC3 | 12 | 122 | * | * | * | 25.0 |
| | | | 230 cc of fluid @ 265 seconds | | | | |

Examples 14-28

The procedure of Examples 1-13 was repeated except that, prior to the addition of the sand/clay mixture, an ionic liquid additive was added to the base fluid. The resulting admixture was then mixed for about 2 minutes. The clay/sand mixture was then added. The results are set forth in Table II:

TABLE II

| Ex. No. | Base Fluid | Additives/ Concentration | mls of fluid/minutes | | | | | CST Time (sec.) |
|---|---|---|---|---|---|---|---|---|
| | | | 0 | 1 | 3 | 5 | 10 | |
| 14 | 2% KCl in DI water | 2 gpt IC3 | 12 | 122 | * | * | * | 25.8 |
| | | | 232 cc @ 136 seconds | | | | | |
| 15 | 2% KCl in DI water | 4 gpt IC3 | 10 | 144 | * | * | * | 20.8 |
| | | | 232 cc @ 100 seconds | | | | | |
| 16 | DI Water + 2 gpt Clay Treat-3C | 2 gpt IC3 | 6 | 72 | 144 | 210 | * | 32.8 |
| | | | 227 cc of fluid @ 340 seconds | | | | | |
| 17 | DI Water + 2 gpt Clay Treat-3C | 4 gpt IC3 | 5 | 90 | 172 | * | * | 30.1 |
| | | | 230 cc of fluid @ 272 seconds | | | | | |
| 18 | 2% KCl in DI water | 1 gpt (75% by vol. IC1 in DI water) | 6 | 125 | * | * | * | 20.0 |
| | | | 245 cc at 122 seconds | | | | | |
| 19 | 2% KCl in DI water | 2 gpt (75% by vol. IC1 in DI water) | 6 | 140 | * | * | * | 17.5 |
| | | | 225 cc at 104 seconds | | | | | |
| 20 | DI Water + 2 gpt Clay Treat-3C | 1 gpt (75% by vol. IC1 in DI water) | 2 | 74 | 136 | 184 | * | 39.8 |
| | | | 200 cc at 331 seconds | | | | | |
| 21 | DI Water + 2 gpt Clay Treat-3C | 2 gpt (75% by vol. IC1 in DI water) | 5 | 88 | 174 | * | * | 26.0 |
| | | | 220 cc at 248 seconds | | | | | |
| 22 | DI water | none | 0 | 3 | 5 | 7 | 10 | 452 |
| 23 | 2% KCl in DI water | none | 1 | 13 | 30 | 40 | 73 | 195 |
| 24 | 2% KCl in DI water | 1 gpt Clay Master-5C | 12 | 58 | 115 | 142 | 215 | 74 |
| 25 | 2% KCl in DI water | 2 gpt Clay Master-5C | 18 | 91 | 170 | * | * | 43.0 |
| | | | 230 cc at 273 seconds | | | | | |
| 26 | DI water + 2 gpt Clay Treat-3C | none | 5 | 37 | 49 | 64 | 93 | 143 |
| 27 | DI water + 2 gpt Clay Treat-3C | 1 gpt Clay Master-5C | 7 | 71 | 129 | 162 | * | 54 |
| | | | 172 cc at 338 seconds | | | | | |
| 28 | DI water + 2 gpt Clay Treat-3C | 2 gpt Clay Master-5C | 8 | 95 | 178 | * | * | 33.5 |
| | | | 190 cc @ 219 seconds | | | | | |

As illustrated in Table I, IC1 is an excellent KCl substitute and clay stabilizer for inhibition of clay swelling. IC1 at a concentration from between 2 to 3 gpt of 75% volume in deionized water was more effective in inhibiting clay swelling than 2% KCl, 2% KCl with 2 gpt Clay Master-5C, 2 gpt Clay Treat-3C in deionized water, and a 2 gpt Clay Treat-3C in deionized water with 2 gpt Clay Master-5C. The 2 to 3 gpt 75% by vol. IC1 containing well treatment composition had lower CST results and higher Fann filter press fluid volumes.

The tables further demonstrate that clay inhibition properties with IC2. Undesired foaming may occur at concentrations between 2 and 3 gpt. Further, Example 3 is evidenced to be an excellent potassium chloride substitute and clay stabilizer compound for inhibition of clay swelling. Concentration of 2 gpt of IC3 as KCl substitute or clay stabilizer was more effective in inhibiting clay swelling than 2% KCl, 2% KCl with 2 gpt Clay Master-5C, 2 gpt Clay Treat-3C in deionized water, and a 2 gpt Clay Treat-3C in deionized water with 2 gpt Clay Master-5C. Well treatment compositions containing 2 gpt IC3 exhibited lower CST results and higher Fann filter press fluid volumes.

Examples 29-50

IC1 and IC3 ionic liquids were evaluated to determine whether any permanent swelling inhibition protection is afforded to treated clay particles upon subsequent exposure to fresh water. These tests were also run in comparison to 2% KCl and 2% KCl with the addition of 2 gpt Clay Master-5C for comparison.

The protocol set forth in Examples 1-24 was repeated. After the removal of all initial treatment fluid volume, all of the solids in the sand/clay pack were collected from the Fann filter press and dispersed in 250 cc of fresh water. The fresh water/pack solids were then mixed in a Waring blender for 5 minutes and allowed to hydrate for 25 minutes in a glass beaker. After 15 minutes, the mixture was stirred with a glass rod and the CST tests were repeated. After the 25 minute period, testing was repeated in the Fann filter press as described above and the fluid volumes recorded at the test time intervals. The results are set forth in Table III below:

TABLE III

| Ex. No. | Base Fluid | Additives/ Concentration | mls of fluid/minutes | | | | | CST Time (sec.) |
|---|---|---|---|---|---|---|---|---|
| | | | 0 | 1 | 3 | 5 | 10 | |
| 29 | 2% KCl in DI Water | 2 gpt (75% by vol. IC1 in DI water) | 5 | 110 232 cc at 110 seconds | * | * | * | 18.9 |
| 30 | Fresh Water Pack Exposure | None | 3 | 56 | 108 | 158 | 232 | 34.4 |
| 31 | 2% KCl in DI Water | 4 gpt (75% by vol. IC1 in DI water) | 6 | 140 222 cc at 104 seconds | * | * | * | 19.8 |
| 32 | Fresh Water Pack Exposure | None | 3 | 55 242 cc at 494 seconds | 116 | 168 | * | 28.7 |
| 33 | DI Water + 2.0 gpt (75% by vol. IC1 in DI water) | None | 5 | 76 218 cc at 270 seconds | 158 | * | * | 25.5 |
| 34 | Fresh Water Pack Exposure | None | 3 | 50 | 100 | 134 | 214 | 29.6 |
| 35 | DI Water + 4 gpt (75% by vol. IC1 in DI water) | None | 5 | 88 222 cc at 208 seconds | 195 | * | * | 19.8 |
| 36 | Fresh Water Pack Exposure | None | 5 | 63 235 cc at 502 seconds | 124 | 172 | * | 28.3 |
| 37 | 2% KCl in DI Water | None | 8 | 28 | 46 | 58 | 82 | 126 |
| 38 | Fresh Water Pack Exposure | None | 2 | 3 | 9 | 15 | 23 | 677 |
| 39 | 2% KCl in DI Water | 2 gpt Clay Master-5C | 18 | 98 | 190 | * | * | 35.5 |
| 40 | Fresh Water Pack Exposure | None | 3 | 44 | 90 | 124 | 186 | 114 |
| 41 | 2% KCl in DI Water | 2 gpt IC3 | 11 | 98 | 227 | * | * | 30.1 |
| 42 | Fresh Water Pack Exposure | None | 3 | 28 | 60 | 140 | 185 | 68.9 |
| 43 | 2% KCl in DI Water | 4 gpt IC3 | 12 | 142 230 cc of fluid @ 165 seconds | * | * | * | 23.8 |
| 44 | Fresh Water Pack Exposure | None | 12 | 74 236 cc of fluid @ 512 seconds | 150 | 175 | * | 42.5 |
| 45 | DI Water + 2 gpt IC3 | None | 6 | 64 | 114 | 150 | 224 | 50.3 |

TABLE III-continued

| Ex. No. | Base Fluid | Additives/ Concentration | \multicolumn{5}{c}{mls of fluid/minutes} | CST Time (sec.) |
| --- | --- | --- | --- | --- | --- | --- | --- | --- |
| | | | 0 | 1 | 3 | 5 | 10 | |
| 46 | Fresh Water Pack Exposure | None | 5 | 40 | 70 | 122 | 145 | 74.0 |
| 47 | DI Water + 4 gpt IC3 | None | 6 | 65 | 140 | 174 | * | 35.3 |
| 48 | Fresh Water Exposure | None | 8 | 38 | 80 | 126 | 164 | 56.3 |
| 49 | DI Water + 6 gpt IC3 | None | 9 | 90 | 180 | * | * | 27.2 |
| 50 | Fresh Water Exposure | None | 8 | 40 | 82 | 130 | 172 | 40.5 |

Table III illustrates that the ionic liquid provided permanent clay swelling protection after exposure of the clays to fresh water. Evaluation studies with the IC3 in the secondary fresh water exposure tests show the IC3 maintained more clay stabilizing activity after the sand pack was exposed to fresh water in comparison to 2% KCl and 2% KCl+2 gpt Clay Master 5C.

Example 51

Samples of a shale core were obtained and cut into small solid pieces ½ inch in diameter. The shale core pieces were placed in separate jars containing distilled water, 2% KCl, 2% KCl +2 gpt IC3, 2% KCl +2 gpt IC1, 2% KCl +2 gpt Clay Master-5C, DI water+2 gpt Clay Treat-3C, DI water+2 gpt Clay Treat-3C+2 gpt Clay Master 5C and the effects of the clay stabilizing formulations on the consolidation and stability of the shale core material were observed. After a 12-hour standing period, it was observed that the 2% KCl +2 gpt IC3 and the 2% KCl +2 gpt IC1 maintained consolidation of the shale core particles most efficiently.

From the initial photos before mixing, a visibly cloudiness of dissolved shale was observed in the distilled water and deionized water+2 gpt Clay Treat-3C samples. After the fluid formulations had been mixed, it was observed that the 2% KCl+2 gpt IC3 and the 2% KCl+2 gpt IC1 formulations had clearer top portions with the largest consolidated particles present on the bottom of the jars. These results are indicative that the ionic liquid containing well treatment compositions were the most efficient in keeping the shale core materials consolidated.

From the foregoing, it will be observed that numerous variations and modifications may be effected without departing from the true spirit and scope of the novel concepts of the invention.

What is claimed is:

1. A method of inhibiting the swelling of clay particulates in a subterranean formation comprising:
   (a) introducing into the subterranean formation a well treatment composition comprising an ionic liquid entrained in an aqueous fluid, wherein the ionic liquid comprises a cation and an anion, the cation being an imidazolium of formula (I):

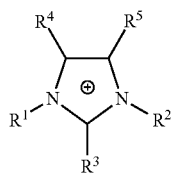

wherein $R^1$ and $R^2$ are independently a $C_1$-$C_6$ alkyl group or a $C_1$-$C_6$ alkoxyalkyl group; $R^3$, $R^4$ and $R^5$ are independently —H, a $C_1$-$C_6$ alkyl, a $C_1$-$C_6$ alkoxyalkyl group or a $C_1$-$C_6$ alkoxy group; and the anion is selected from the group consisting of X, perchlorate, thiocyanate, cyanate, a $C_1$-$C_6$ carboxylate, an alkyl sulfate, methanesulfonate, $BX_4^-$, $PF_6^-$, $AsF_6^-$, $SbF_6^-$, $NO_2^-$, $NO_3^-$ and $SO_4^-$; wherein X is a halide; and
   (b) delivering the aqueous fluid with entrained ionic liquid into the subterranean formation
wherein (i) the amount of ionic liquid in the well treatment composition is between from about 0.03 to 0.6 percent by volume; (ii) the ionic liquid is in contact with the formation for a time sufficient to inhibit swelling of clay particulates in the formation; and (iii) the affinity of clay particulates in the formation for the ionic liquid is maintained after treatment of the subterranean formation with the well treatment composition.

2. The method of claim 1, wherein $R^3$, $R^4$ and $R^5$ are —H.

3. The method of claim 2, wherein $R^1$ and $R^2$ are methyl or ethyl.

4. The method of claim 3, wherein the anion is a halide.

5. The method of claim 4, wherein the ionic liquid is 1-ethyl-3-methylimidazolium chloride.

6. The method of claim 1, wherein the aqueous fluid is selected from the group consisting of a drilling fluid, drill-in fluid, stimulation fluid and gravel pack fluid.

7. The method of claim 6, wherein the aqueous fluid is selected from the group consisting of a fracturing fluid and acidizing fluid.

8. The method of claim 1, wherein the amount of ionic liquid in the well treatment composition is between from about 0.1 to 0.6 percent by volume.

9. The method of claim 1, wherein the cation is 1-ethyl-3-methylimidazolium chloride, 1-ethyl-3-methylimidazolium methanesulfonate, 1-butyl-3-methylimidazolium chloride, 1-butyl-3-methylimidazolium methanesulfonate, 1-ethyl-2,3-di-methylimidazolium ethylsulfate, and 1,2,3-trimethylimidazolium methylsulfate.

10. The method of claim 1, wherein the amount of ionic liquid in the well treatment composition is between from about 0.03 to about 0.06 percent by volume.

11. The method of claim 6, wherein the aqueous fluid is a gravel pack fluid.

12. The method of claim 1, wherein the clay is selected from the group consisting of montmorillonite, saponite, nontronite, hectorite, sauconite; kaolinite, nacrite, dickite, halloysite, hydrobiotite, glauconite, illite, bramallite, chlorite, chamosite, vermiculite, attapulgite and sepiolite.

13. A method of treating a subterranean formation to substantially prevent swelling of the clay in the formation which comprises introducing into the formation a well treatment composition comprising an ionic liquid dispersed, dissolved or entrained in an aqueous fluid, wherein the amount of ionic liquid in the well treatment composition is between from about 0.03 to 0.6 percent by volume and wherein the ionic liquid is selected from the group consisting of 1-ethyl-3-methylimidazolium chloride, 1-ethyl-3-methylimidazolium methanesulfonate, 1-butyl-3-methylimidazolium chloride, 1-butyl-3-methylimidazolium methanesulfonate, methyl-tri-n-butylammonium methylsulfate, 1-ethyl-2,3-di-methylimidazolium ethylsulfate, 1,2,3-trimethyl-imidazolium methylsulfate and tris-(2-hydroxyethyl)-methylammonium methylsulfate.

14. The method of claim 13, wherein the ionic liquid is 1-ethyl-3-methylimidazolium chloride.

15. The method of claim 13, wherein the aqueous fluid is selected from the group consisting of a fracturing fluid and acidizing fluid.

16. The method of claim 13, wherein the aqueous fluid is selected from the group consisting of a drilling fluid, drill-in fluid, stimulation fluid and gravel pack fluid.

17. The method of claim 13, wherein the amount of ionic liquid in the well treatment composition is between from about 0.1 to about 0.6 percent by volume.

18. A method of reducing or substantially eliminating permeability damage caused by swellable clay in a subterranean formation comprising:
(a) introducing into the subterranean formation an aqueous well treatment fluid comprising an ionic liquid entrained within an aqueous fluid, wherein the ionic liquid is present in the aqueous well treatment fluid in an amount between from about 0.03 to 0.6 percent by volume and wherein the ionic liquid comprises a cation and an anion, the cation being an imidazolium of formula (I):

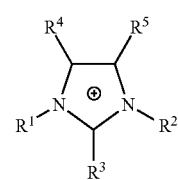

wherein $R^1$ and $R^2$ are independently a $C_1$-$C_6$ alkyl group or a $C_1$-$C_6$ alkoxyalkyl group; $R^3$, $R^4$ and $R^5$ are independently —H, a $C_1$-$C_6$ alkyl, a $C_1$-$C_6$ alkoxyalkyl group or a $C_1$-$C_6$ alkoxy group; and the anion is selected from the group consisting of X, perchlorate, thiocyanate, cyanate, a $C_1$-$C_6$ carboxylate, an alkyl sulfate, methanesulfonate, $BX_4^-$, $PF_6^-$, $AsF_6^-$, $SbF_6^-$, $NO_2^-$, $NO_3^-$ and $SO_4^-$; wherein X is a halide; and (b) preventing the swelling and migration of the swellable clay in the formation upon exposure of the swellable clay to water, the affinity of the swellable clay with the ionic liquid preventing the swelling of the swellable clay.

19. The method of claim 18, wherein the ionic liquid is selected from the group consisting of 1-ethyl-3-methylimidazolium chloride,1-ethyl-3-methylimidazolium methanesulfonate, 1-butyl-3-methylimidazolium chloride, 1-butyl-3-methylimidazolium methanesulfonate, 1-ethyl-2,3-dimethylimidazolium ethylsulfate, and 1,2,3-trimethyl-imidazolium methylsulfate.

20. The method of claim 18, wherein $R^3$, $R^4$ and $R^5$ are —H.

21. The method of claim 20, wherein $R^1$ and $R^2$ are methyl or ethyl.

22. The method of claim 21, wherein the anion is a halide.

23. The method of claim 18, wherein the anion is a halide.

24. The method of claim 18, wherein the aqueous fluid is selected from the group consisting of a fracturing fluid, acidizing fluid, drilling fluid, drill-in fluid, stimulation fluid and gravel pack fluid.

25. The method of claim 18, wherein $R^1$ and $R^2$ are methyl or ethyl and $R^3$, $R^4$ and $R^5$ are —H.

* * * * *

UNITED STATES PATENT AND TRADEMARK OFFICE
CERTIFICATE OF CORRECTION

| | | |
|---|---|---|
| PATENT NO. | : 8,084,402 B2 | Page 1 of 1 |
| APPLICATION NO. | : 11/880726 | |
| DATED | : December 27, 2011 | |
| INVENTOR(S) | : Sandra L. Berry et al. | |

It is certified that error appears in the above-identified patent and that said Letters Patent is hereby corrected as shown below:

ON THE TITLE PAGE:

Item (73) Assignee should read -Baker Hughes Incorporated-.

Signed and Sealed this

Twenty-first Day of February, 2012

David J. Kappos
*Director of the United States Patent and Trademark Office*